(12) United States Patent
Woodward et al.

(10) Patent No.: US 12,267,422 B2
(45) Date of Patent: Apr. 1, 2025

(54) QUANTUM NETWORK AND AUTHENTICATION METHOD

(71) Applicant: Kabushiki Kaisha Toshiba, Tokyo (JP)

(72) Inventors: Robert Ian Woodward, Cambridge (GB); Benjamin Marsh, Cambridge (GB); James F. Dynes, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 17/886,559

(22) Filed: Aug. 12, 2022

(65) Prior Publication Data

US 2023/0275754 A1    Aug. 31, 2023

(30) Foreign Application Priority Data

Feb. 25, 2022  (GB) ..................................... 2202650

(51) Int. Cl.
*H04L 9/08*     (2006.01)
*H04L 9/32*     (2006.01)

(52) U.S. Cl.
CPC ............ *H04L 9/0855* (2013.01); *H04L 9/321* (2013.01)

(58) Field of Classification Search
CPC ....... H04L 9/0855; H04L 9/321; H04L 9/083; H04L 9/0852; H04L 9/0861; H04L 9/32; H04L 9/0819; H04L 9/08
See application file for complete search history.

(56) References Cited

U.S. PATENT DOCUMENTS

| 2011/0231665 A1 | 9/2011 | Wiseman |
| 2013/0101121 A1 | 4/2013 | Nordholt et al. |

(Continued)

FOREIGN PATENT DOCUMENTS

| CN | 109787763 A | 5/2019 |

OTHER PUBLICATIONS

United Kingdom Office Action issued Jul. 10, 2024 in United Kingdom Application GB2202650.4, 3 pages.

(Continued)

*Primary Examiner* — Quazi Farooqui
(74) *Attorney, Agent, or Firm* — Oblon, McClelland, Maier & Neustadt, L.L.P.

(57) ABSTRACT

A method for use in a quantum communication network comprising a first node, a second node and a third node, the method performed by the third node, the method comprising:
  receiving, from the first node, a request for authentication key data for authenticating communication with the second node;
  in response to the request:
    generating the first authentication key data;
    sending, to the first node, a first message comprising first authentication key data for authenticating communication between the first node and the second node, wherein the first message is authenticated using second authentication key data stored on the first node and the third node, and wherein the first message is encrypted using a first cryptographic key exchanged with the first node on the quantum communication network; and
    sending, to the second node, a second message comprising the first authentication key data, wherein the second message is authenticated using third authen- (Continued)

tication key data stored on the second node and the third node, and wherein the second message is encrypted using a second cryptographic key exchanged with the second node on the quantum communication network.

20 Claims, 12 Drawing Sheets

(56) References Cited

U.S. PATENT DOCUMENTS

2017/0338951 A1* 11/2017 Fu .................. H04L 9/0894
2019/0379463 A1   12/2019 Shields et al.

OTHER PUBLICATIONS

British Combined Examination and Search Report issued Jul. 28, 2022 in British Patent Application No. GB2202650.4, filed on Feb. 25, 2022, 6 pages.
Peev et al., "The SECOQC quantum key distribution network in Vienna", New J. Phys. 11, 075001, 2009, 38 pages.
Wang et al., "Experimental Authentication of Quantum Key Distribution with Post-quantum Cryptography", npj: Quantum Information, 7 pages, 2021, arXiv:2009.04662.
Constantin et al., "An FPGA Based 4 Mbps Secret Key Distillation Engine for Quantum Key Distribution Systems", J Sign Process Syst 86, 2017, 15 pages.
Cui et al., "An authentication scheme with high throughput based on FPGA for a practical QKD system", Optik 126, 2015, pp. 4747-4750.
Wegman et al., "New hash functions and their use in authentication and set equality", Journal of Computer and System Sciences 22, 1981, pp. 265-279.
Shoup, "On Fast and Provably Secure Message Authentication Based on Universal Hashing", Advances in Cryptology—CRYPTO'96, Lecture Notes in Computer Science 1109, Dec. 1996, 12 pages.
Bernstein, "The Poly1305-AES Message-Authentication Code", Lecture Notes in Computer Science, vol. 3557, 2005, 18 pages.
Carter et al., "Universal classes of hash functions" Journal of computer and system sciences, 18(2), 1979, pp. 143-154.
Dynes et al., "Cambridge quantum network", npj: Quantum Information, 5(1), 2019, 8 pages.
Needham et al., "Using encryption for authentication in large networks of computers", Communications of the ACM, 21(12), Dec. 1978, pp. 993-999.
Callas et al., "OpenPGP MessageFormat, RFC 4880", Callas 2007, 90 pages.
"Web of trust", Wikipedia, Aug. 2022, 7 pages, https://en.wikipedia.org/wiki/Web_of_trust.

* cited by examiner

QUANTUM NETWORK AND AUTHENTICATION METHOD

This application claims priority from GB application number GB 2202650.4 which is herein incorporated by reference.

FIELD

Embodiments described herein relate to a quantum network and an authentication method.

BACKGROUND

Quantum key distribution is a technology for generating perfectly random quantum keys at two remote nodes, which can be used for data encryption to ensure secure communications. The basic operating principle of QKD relies on encoding and measuring quantum states, followed by discussion between the two nodes over an authenticated classical channel.

DETAILED DESCRIPTION

Embodiments will now be described with reference to the following figures in which.

Figure 8:
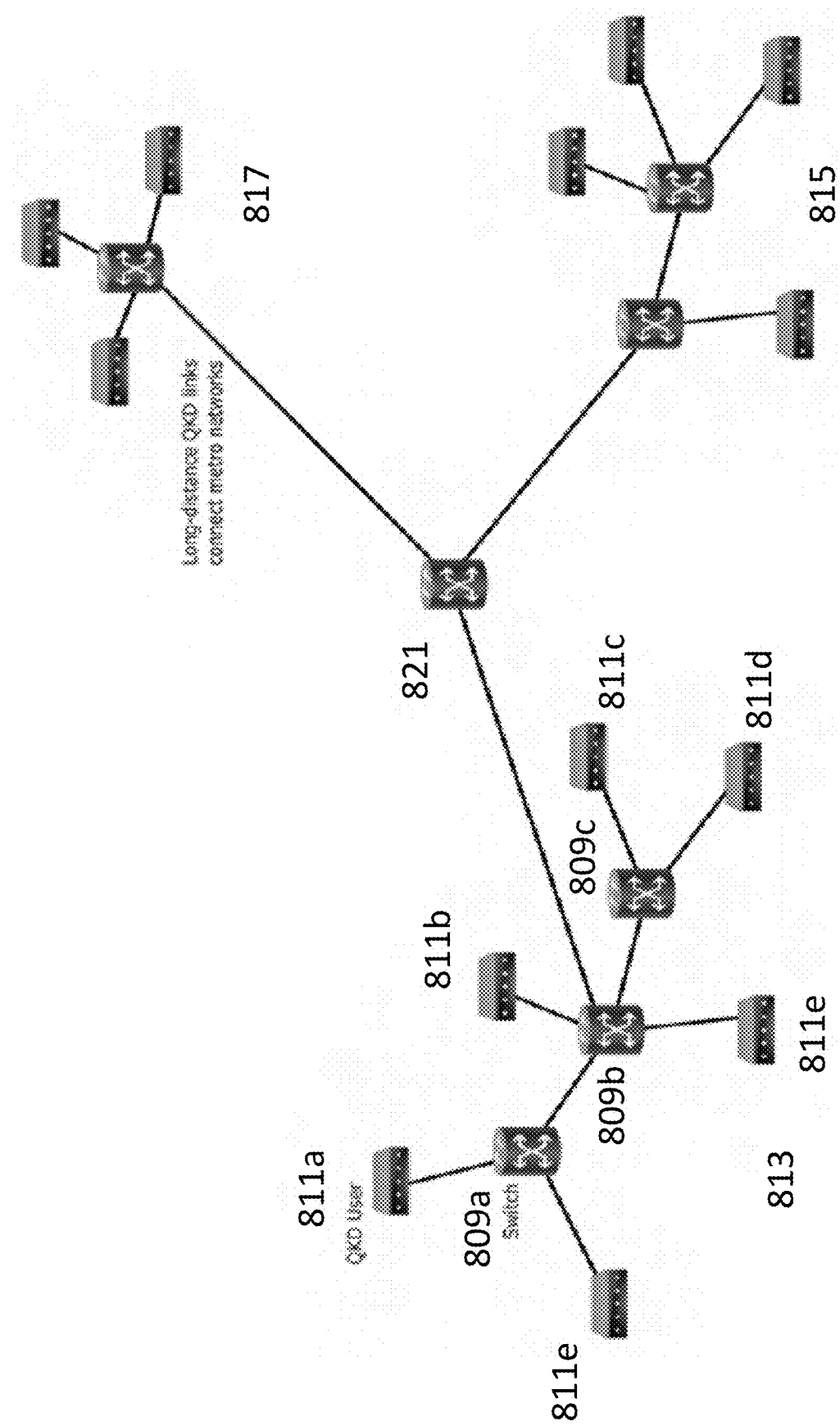
Figure 9:
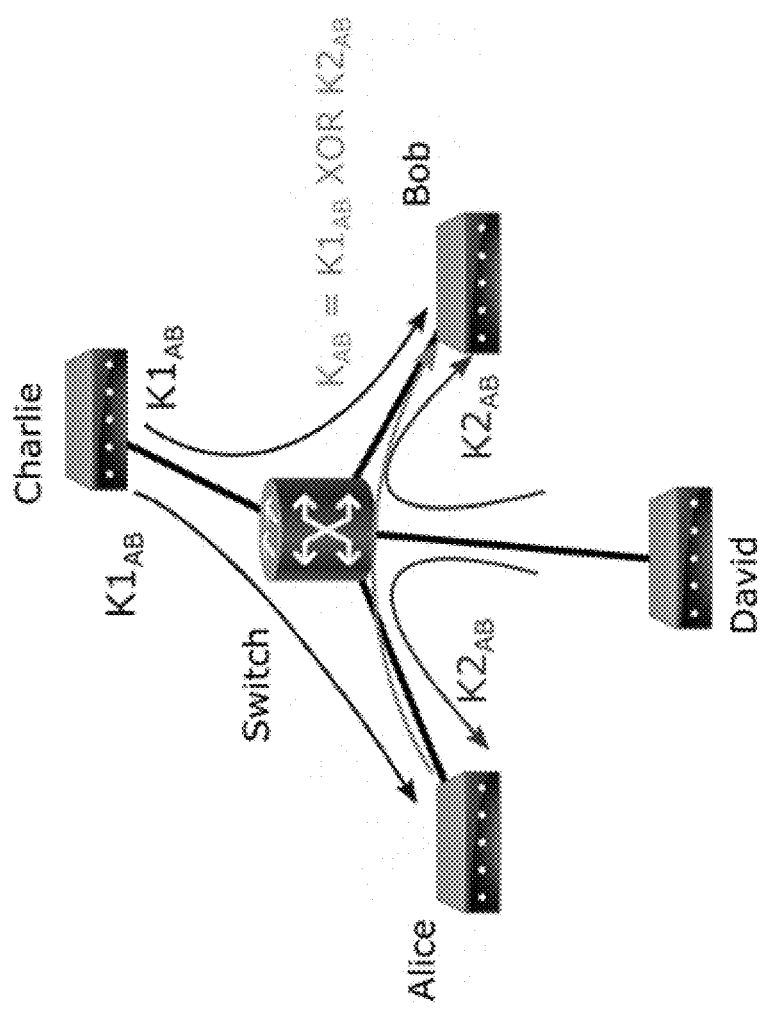

FIG. 8 schematic of a large scale network comprising three sub networks in accordance with an embodiment; and FIG. 9 is a schematic showing a network where the key shared between two user nodes comprises PSKs from two trusted nodes.

In a first embodiment, a method for use in a quantum communication network is provided, the network comprising a first node, a second node and a third node, the method performed by the third node, the method comprising:

receiving, from the first node, a request for authentication key data for authenticating communication with the second node;

in response to the request:
  generating the first authentication key data;
  sending, to the first node, a first message comprising first authentication key data for authenticating communication between the first node and the second node, wherein the first message is authenticated using second authentication key data stored on the first node and the third node, and wherein the first message is encrypted using a first cryptographic key exchanged with the first node on the quantum communication network; and
  sending, to the second node, a second message comprising the first authentication key data, wherein the second message is authenticated using third authentication key data stored on the second node and the third node, and wherein the second message is encrypted using a second cryptographic key exchanged with the second node on the quantum communication network.

The above embodiment relates to pre-shared key (PSK) encrypted & authenticated communications where two parties who wish to communicate will both need to have access to the same private shared key. To ensure security this means that there needs to be a secure way of installing a PSK between two parties who wish to use PSK.

Quantum key distribution (QKD) is a technology for generating perfectly random quantum keys at two remote nodes, which can be used for data encryption to ensure secure communications. The basic operating principle of QKD relies on encoding and measuring quantum states. This is then followed by discussion between the two nodes over an authenticated classical channel, which enables them to detect the presence of an eavesdropper. Part of the discussion is a process called sifting which is where the two nodes throw away measurements where the encoding basis and the decoding basis differed.

A requirement for QKD, therefore, is that the two users can authenticate each other. This means that they can, without doubt, verify the classical messages they receive were sent by the other party and not tampered with in transit. In other words, this avoids a man-in-the-middle attack. Authentication could be done using public key cryptography (e.g. RSA), but this is not the preferred solution due to known weaknesses in such approaches to quantum computers. Instead, QKD systems more commonly authenticate each other using a pre-shared symmetric key (PSK).

As QKD is a nascent technology, the majority of QKD systems to date operate over a single point-to-point link. Pre-shared key material is thus installed by the manufacturer when setting up the link and this is used for initial authentication. (Numerous algorithms exist for using pre-shared key material to authenticate messages and users.) Once authenticated QKD starts, additional PSK material can be built up between the users and stored for subsequent authentication sessions.

Quantum networks are an essential next step for QKD technology, where numerous QKD systems will be interconnected to permit quantum-secure communications between a number of users. This could be an optically switched network, where each user possesses a QKD system and the quantum links between them are formed by optical switching. These quantum channels between users could be optical fibres, or alternatively, free-space links, potentially even via a satellite between nodes 1000s km apart. However, there is a need to make sure that the classical communication channels are also secured. The process of installing a new QKD user into a network could require the manufacturer to visit each of the other QKD nodes and manually install a pre-shared symmetric key into them that is shared with the new QKD system. This is not scalable as each possible QKD system pairing would need a separate PSK to be installed, requiring N(N−1)/2 PSKs for a network of N nodes.

The above method allows a PSK to be installed in a user node using QKD. Installing a PSK via QKD maintains the security but avoids the need for a PSK to be installed by visiting a node to physically install a PSK. The peer to peer method discussed above allows PSKs to be generated and securely distributed to nodes to allow two nodes to be able to authenticate one another and thus safely communicate over a classical channel.

The above described method allows authentication via a trusted third party in a peer-to-peer manner. Thus, allowing new users to join an optically-switched QKD network and to authenticate with previously untrusted nodes through the action of another node on the network that acts as a trusted third party (i.e. a party with whom the users can already independently authenticate by sharing a symmetric PSK with it). Information-theoretic security (ITS) can be achieved for the authentication procedure by using the PSK in an ITS cipher or using ITS message authentication codes (for example, in the style of Wegman and Carter).

The situation can arise where the third node does not already have a PSK with both the first and second nodes. In this situation, the method further comprises:

determining that authentication key data is not available for authenticating communication with the second node;
  requesting, from the one or more trusted nodes, authentication key data for authenticating communication with the second node;
  receiving, from a fourth node of the one or more trusted nodes, a third message comprising the third authentication key data, wherein the third message is authenticated using fourth authentication key data stored on the third node and the fourth node, and wherein the third message is encrypted using a third cryptographic key exchanged with the fourth node on the quantum communication network; and
  storing the third authentication key data.

In a further embodiment, the request comprises one or more quality of service criteria, and wherein the one or more trusted nodes are selected from a plurality of trusted nodes based on the one or more quality of service criteria. The quality of service criteria may comprise the size of PSK key store, QKD secure bit rate between nodes or manufacturer trust level (e.g. given QKD at the current technology stage relies on manufacturers implementing QKD correctly, network operators may prefer to select a node if it's made by a "more trusted" vendor compared to a less trusted vendor). "Latency" could also be a QoS parameter in terms of classical communications when choosing links.

Where a fourth node has been used, the first message may comprises an indication that the identity of the second node was authenticated using the fourth node.

In a further embodiment, a method, for use in a quantum communication network is provided, the network comprising: a first node; a second node; and one or more trusted nodes, the method performed by the first node, the method comprising:

requesting, from the one or more trusted nodes, authentication key data for authenticating communication with the second node;
  receiving, from a third node of the one or more trusted nodes, a first message comprising first authentication key data for authenticating communication with the second node, wherein the first message is authenticated using second authentication key data stored on the first node and the third node, and wherein the first message is encrypted using a first cryptographic key exchanged between the first node and the third node on the quantum communication network.

The method may further comprise: receiving, from a fourth node of the one or more trusted nodes, a second message comprising third authentication key data for authenticating communication with the second node, wherein the second message is authenticated using fourth authentication key data stored on the first node and the fourth node, and wherein the second message is encrypted using a second cryptographic key exchanged between the first node and the fourth node on the quantum communication network; and deriving, based on the first authentication key data and the third authentication key data, fifth authentication key data for authenticating communication with the second node. Deriving the fifth authentication key data may comprise performing one or more bitwise operations on the first authentication key data and the third authentication key data. The one or more bitwise operations may comprise an XOR operation.

In a further embodiment, the first node or the second node is configured to receive an indication that the third node has been compromised; and revoke the first authentication key data and/or authentication key data derived from the first authentication key data.

For example, in an embodiment, if a node "first node" in the network becomes aware that another node "second node" has been compromised, a message can be sent to all nodes trusted by the first node that the second node has been compromised. This message would be authenticated (i.e. to prove it came from a valid trusted source) using the PSKs/ with QKD to replenish PSK as its used. The nodes receiving the message "don't trust the second node anymore" should then delete any PSK material they have with the second node.

In a further embodiment, the first node publicly posts "don't trust the second node". However, without authentication, the network could be compromised by a malicious party posting that one or more nodes should not be trusted.

In an embodiment, the first message comprises an indication that the third node of the one or more trusted nodes authenticated the identity of the second node using a fifth node other than the one or more trusted nodes. This allows a node to be aware of the nodes which have been used in providing a PSK.

In a further embodiment, the first node or the second node is configured to receive an indication that the fifth node has been compromised; and revoking the first authentication key data and/or authentication data derived from the first authentication key data.

In a further embodiment, wherein requesting, from the one or more trusted nodes, authentication key data for authenticating communication between the first node and the second node comprises:

requesting, from a first subset of the one or more trusted nodes, authentication key data for authenticating communication between the first node and the second node;
  inferring that the first subset of the one or more trusted nodes is unable to provide the authentication key data; and
  in response to the inference, requesting, from a second subset of the one or more trusted nodes, authentication key data for authenticating communication between the first node and the second node,
  wherein the first subset of the one or more trusted nodes are nodes that satisfy a first criteria, and wherein the second subset of the one or more trusted nodes comprises the third node.

For example the first criteria may indicate whether the nodes in the first subset are geographically nearer the first node than the second subset of the one or more trusted nodes, and wherein the second subset of the one or more trusted nodes comprises the third node. Other examples of the criteria may be latency requirements or a further Quality of Service parameter.

In a further embodiment, wherein requesting, from the one or more trusted nodes, authentication key data for authenticating communication between the first node and the second node comprises:
  querying the one or more trusted nodes to determine whether any of the one or more trusted nodes stores key authentication data for communicating with the second node;
  inferring that none of the one or more trusted nodes stores key authentication data for communicating with the second node; and
  querying the one or more trusted nodes to determine whether any of the one or more trusted nodes stores key authentication data for another node that stores key authentication data for communicating with the second node.

In a further embodiment, there is provided a first node for use in a quantum communication network comprising the first node, a second node and one or more trusted nodes, wherein the first node is configured to:
  request, from the one or more trusted nodes, authentication key data for authenticating communication with the second node;
  receive, from a third node of the one or more trusted nodes, a first message comprising first authentication key data for authenticating communication with the second node, wherein the first message is authenticated using second authentication key data stored on the first node and the third node, and wherein the first message is encrypted using a first cryptographic key exchanged with the third node on the quantum communication network.

In an embodiment, the user nodes comprise a quantum key distribution unit, the quantum key distribution unit comprising at least one of:
  an encoder, said encoder being configured to encode information on light, wherein the information is encoded by randomly selecting one state from a plurality of states to send to another node, the light leaving said server in pulses which contain on average less than one photon; and
  a decoder, said decoder being configured to receive light pulses which contain on average less than one photon and decode information from said light pulses by measuring said light pulses, wherein the measurement basis for the measurement are randomly selected from a set of measurement bases to allow measurement of the states used to encode the information,
  the quantum key distribution unit further comprising a sifting unit configured to allow the user node to compare the basis it used for encoding or decoding with that used by the other node for decoding or encoding, the quantum key distribution unit being configured to discard the information from pulses where the encoding basis and the decoding measurement basis did not match.

The QKD unit may also be configured to perform further steps such as error correction and privacy amplification.

Nodes may be provided with an encoder or a decoder which allow communication with other user nodes that have a decoder or encoder. In further embodiments, the nodes may be provided with both a decoder and an encoder so that QKD may be performed with nodes that only have an encoder or only have a decoder. The encoder/decoder may be configured to perform QKD using polarisation or phase.

In a further embodiment, the first node is further configured to:
  receive, from a fourth node of the one or more trusted nodes, an indication that a fifth node other than the one or more trusted nodes, wishes to initiate communication;
  receive, from the fourth node, a second message comprising second authentication key data for authenticating communication with the fifth node, wherein the second message is authenticated using third authentication key data stored on the first node and the fourth node, and wherein the second message is encrypted using a second cryptographic key exchanged with the fourth node on the quantum communication network.

The first node may be further configured to:
  receive, from a sixth node of the one or more trusted nodes, a third message comprising fourth authentication key data for authenticating communication with the fifth node, wherein the third message is authenticated using fifth authentication key data stored on the first node and the fifth node, and wherein the third message is encrypted using a third cryptographic key exchanged with the sixth node on the quantum communication network; and
  derive, based on the second authentication key data and the fourth authentication key data stored, sixth authentication key data for authenticating communication with the sixth node.

The first node may be further configured to:
  receive, from a seventh node of the one or more trusted nodes, a request for authentication key data for authenticating communication between the seventh node of the one or more trusted nodes and an eighth node;
  send, to the seventh node, a fourth message comprising seventh authentication key data for authenticating communication between the seventh node and the eighth node, wherein the fourth message is authenticated using eighth authentication key data stored on the first node and the seventh node, and wherein the first message is encrypted using a fourth cryptographic key exchanged with the seventh node on the quantum communication network; and
  sending, to the eighth node, a fifth message comprising the seventh authentication key data, wherein the fifth message is authenticated using ninth authentication key data stored on the first node and the eighth node, and wherein the fifth message is encrypted using a fifth cryptographic key exchanged with the eighth node on the quantum communication network.

The first node may be further configured to:
  determining that authentication key data is not available for authenticating communication with the eighth node;
  requesting, from the one or more trusted nodes, authentication key data for authenticating communication with the eighth node;
  receiving, from a ninth node of the one or more trusted nodes, a sixth message comprising the ninth authentication key data, wherein the sixth message is authenticated using tenth authentication key data stored on the first node and the ninth node, and wherein the sixth message is encrypted using a sixth cryptographic key exchanged with the ninth node on the quantum communication network; and storing the ninth authentication key data. The fifth message may comprise an indication that the identity of the eighth node was authenticated using the ninth node.

In a further embodiment, a quantum communication network is provided comprising the above nodes.

In an embodiment, an authentication system for QKD networks is provided based on decentralised peer-to-peer authentication, where a QKD user node can act as a trusted third party, generating a random number which is sent to users that the node is already authenticated with over a QKD-secured link for them to use as a pre-shared key (PSK) for authentication.

In an embodiment, a scalable information-theoretic secure communication network is provided using PSK for peer-to-peer authentication and QKD to grow keys to use for data encryption, where the initial PSK for user-to-user QKD is obtained through a trusted third party.

In an embodiment, an optically switched peer-to-peer QKD network is provided with authentication provided through network communication with a trusted third party, which is another user on the network. The network functionality and optical switching may be controlled by software, for example using software defined networking (SDN).

In an embodiment, a system for locating trusted third parties for QKD authentication between two users is provided, based on intermediate trusted third parties.

In an embodiment, a quantum network is provided where authentication is performed by obtaining a PSK between two users from at least two trusted third parties, such that the used PSK authentication key between initially untrusted users is obtained by performing an XOR operation on two independent PSK keys, mitigating against the threat that one is compromised.

In an embodiment, an authentication system is provided enabling authenticated quantum communications between two user nodes, where the user nodes have hardware from different vendors and do not rely on the vendor for initial authentication.

Figure 1:
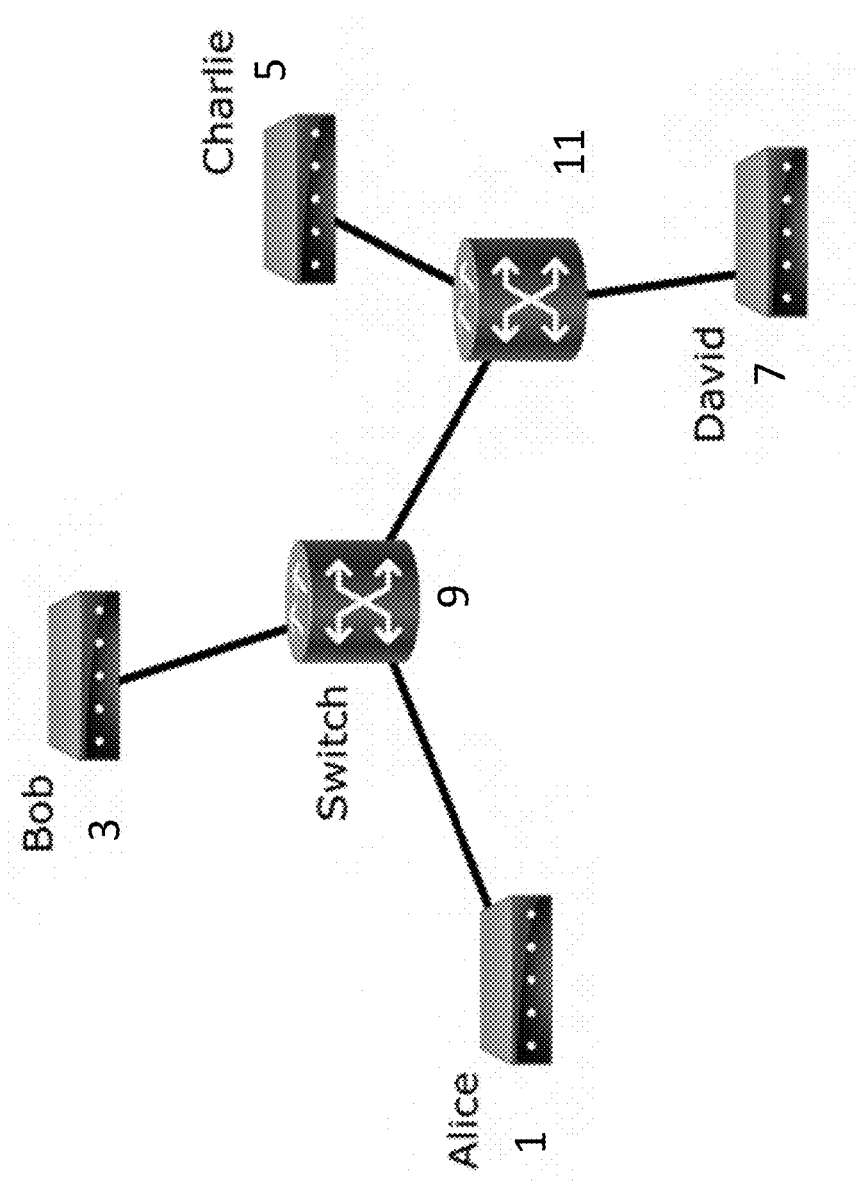
FIG. 1 is a schematic of a network in accordance with an embodiment.

FIG. 1 is a schematic of a quantum network in accordance with an embodiment, the network comprises a first node 1 (which will be referred to as "Alice"), a second node 3 (which will be referred to as "Bob"), a third node 5 (which will be referred to a Charlie) and a fourth node 7 (which will be referred to as David).

The details of the nodes of Alice 1, Bob 3, Charlie 5 and David 7 will be described later. Alice 1 and Bob 3 are connected to each other via a switch 9. The switch 9 is configured such that Alice 1 can selectively communicate with either Bob 3 or a second switch 11. The second switch 11 is connected to Charlie 5 and David 7 which allows Charlie 5 and David 7 to communicate directly with one another. The presence of first switch 9 and second switch 11 allows Alice or Bob to selectively communicate with either of Charlie 5 or David 7.

In the example of FIG. 1, the four nodes: Alice 1, Bob 3, Charlie and David 7 and the first switch 9 and the second switch 11 are linked by optical cables. However, one or more of the connections could be provided by free space. Also, in this example, four nodes and two switches are shown to explain the concept in its simplest form. However, the system may be configured to incorporate more or less nodes and different numbers of switches.

The switches 9 and 11 create direct optical connections between nodes 1, 3, 5, and 7. In an embodiment, each optical switch could be an active reconfigurable switch (e.g. a MEMS-based or liquid crystal-based matrix switch) or alternatively, could employ passive wavelength switching/routing. It is also possible for all parties to be fully and independently connected by optical fibres, forming a dense closed mesh network. In yet another network design, an optical switch could be included in each of the user nodes to reconfigure the optical links between them (for example patent US 2019/0379463 A1).

In an embodiment, network administration (e.g. signalling the optical switch to reconfigure links) could be performed using the same channel as occupied by the signals that travel between the nodes, or alternatively, a separate public communication channel (e.g. the classical internet). This is compatible with new network architectures that employ software-defined networking (SDN), as well as conventional networks. It should be noted that "channel" is taken to mean a logical channel and it is possible for data signals, either quantum or classical to be transmitted on the same physical channel as each other and also as control signals Prior to considering the arrangement of FIG. 1, a brief overview of quantum communication will be given.

A basic quantum communication protocol which uses polarisation will now be explained. However, it should be noted that this is not meant as limiting and other protocols could also be used, for example, phase or energy time. Also, although a specific polarisation protocol will be described, other polarisation based protocols could also be used.

The protocol uses two bases wherein each basis is described by two orthogonal states. For this example the basis of horizontal/vertical (H/V) and Diagonal/Antidiagonal D/A. However, the left circularly polarized/right circularly polarized (L/R) basis could also be selected.

The sender in the protocol prepares states with one of H, V, D or A polarisation. In other words, the prepared states are selected from two orthogonal states (H and V or D and A) in one of two bases H/V and D/A. This can be thought of as sending a signal of 0 and 1 in one of two bases, for example H=0, V=1 in the H/V basis and D=0, A=1 in the D/A basis. The pulses are attenuated so that they comprise on average, one photon or less. Thus, if a measurement is made on the pulse, the pulse is destroyed. Also, it is not possible to split the pulse.

The receiver uses a measurement basis for the polarisation of a pulse selected from the H/V basis or the D/A basis. The selection of the measurement bases can be active or passive. In passive selection the basis is selected using fixed components, such as a beam splitter. In "active" basis choice, the receiver makes a decision which basis to measure in—e.g. using a modulator with an electrical control signal. If the basis used to measure the pulse at the receiver is the same as the basis used to encode the pulse, then the receiver's measurement of the pulse is accurate. However, if the receiver selects the other basis to measure the pulse, then there will be a 50% error in the result measured by the receiver.

To establish a key, the sender and receiver compare the basis that were used to encoder and measure (decode). If they match, the results are kept, if they do not match the results are discarded. The above method is very secure. If an eavesdropped intercepts the pulses and measures then, the eavesdropper must prepare another pulse to send to the receiver. However, the eavesdropper will not know the correct measurement basis and will therefore only has a 50% chance of correct measuring a pulse. Any pulse recreated by the eavesdropper will cause a larger error rate to the receiver which can be used to evidence the presence of an eavesdropper. The sender and receiver compare a small part of the key to determine the error rate and hence the presence of an eavesdropper.

Although the above has been described in relation to polarisation this is as an illustration. Other QKD protocols could be used which are based on phase or other systems such as energy/time.

The above QKD requires two channels, a "quantum channel" which is used for the communication of pulses that contain, one average, one photon or less, and a classical channel which is used for discussion of the basis ("sifting") and subsequent post-processing ("error correction" and "privacy amplification"). Also, the classical channel can be used for further communication once the key has been established on the quantum channel. The word "channel" here is a logical channel and does not need to be a physically separate channel. It is possible for quantum and classical channels to share the same physical fibre.

However, for the sifting & post-processing processes, the classical channel also needs to be authenticated. This means that, without doubt, it can be verified that the classical messages communicated between Alice and Bob were sent by the other party and not tampered with in transit. In other words, this avoids a man-in-the-middle attack. Authentication could be done using public key cryptography (e.g. RSA). However, in an embodiment, Alice and Bob authenticate each other using a pre-shared symmetric key (PSK).

For completeness, it is noted that if two parties share a private key, they can authenticate each other using many different methods. One method involves the use of a message authentication code (MAC). Here, the sender (e.g. Alice) and the receiver (e.g. Bob) share a key (PSK).

Alice then generates a MAC by inputting a message and the PSK into a known MAC algorithm. The generated MAC and the message are then sent to Bob. Bob then inputs the message and his PSK into the known MAC algorithm and compares the output with the MAC sent by Alice. If they match, he knows that the message and MAC codes that he has received have been sent by Alice. Alice can authenticate Bob by asking Bob to repeat the process using a different message and sending the newly generated MAC and message back to Alice. Alice can then input in the new message into her algorithm with her key to see if her newly generated MAC code matches the one sent by Bob.

However, the situation can arise where Alice and another node do not already share a PSK or it is known that the PSK that they share has been compromised.

Figure 2A:
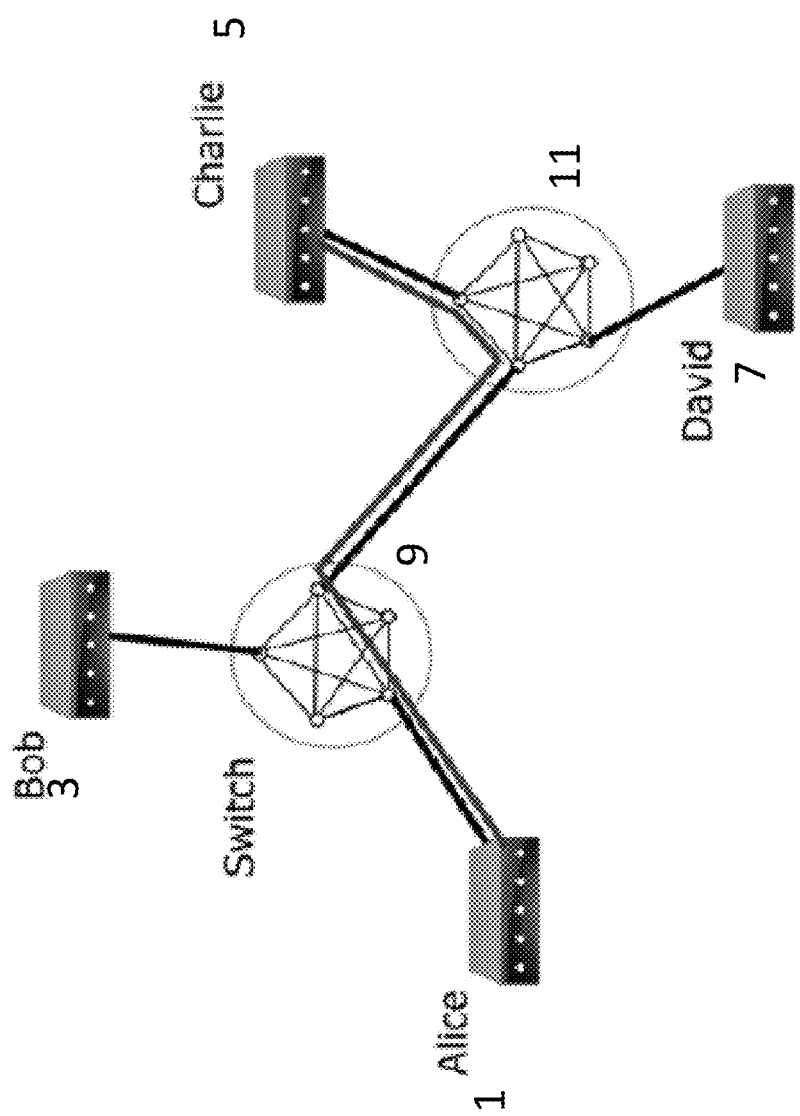
FIGS. 2A and 2B is a schematic showing the messages passed between a trusted node and two user nodes.
Figure 2B:
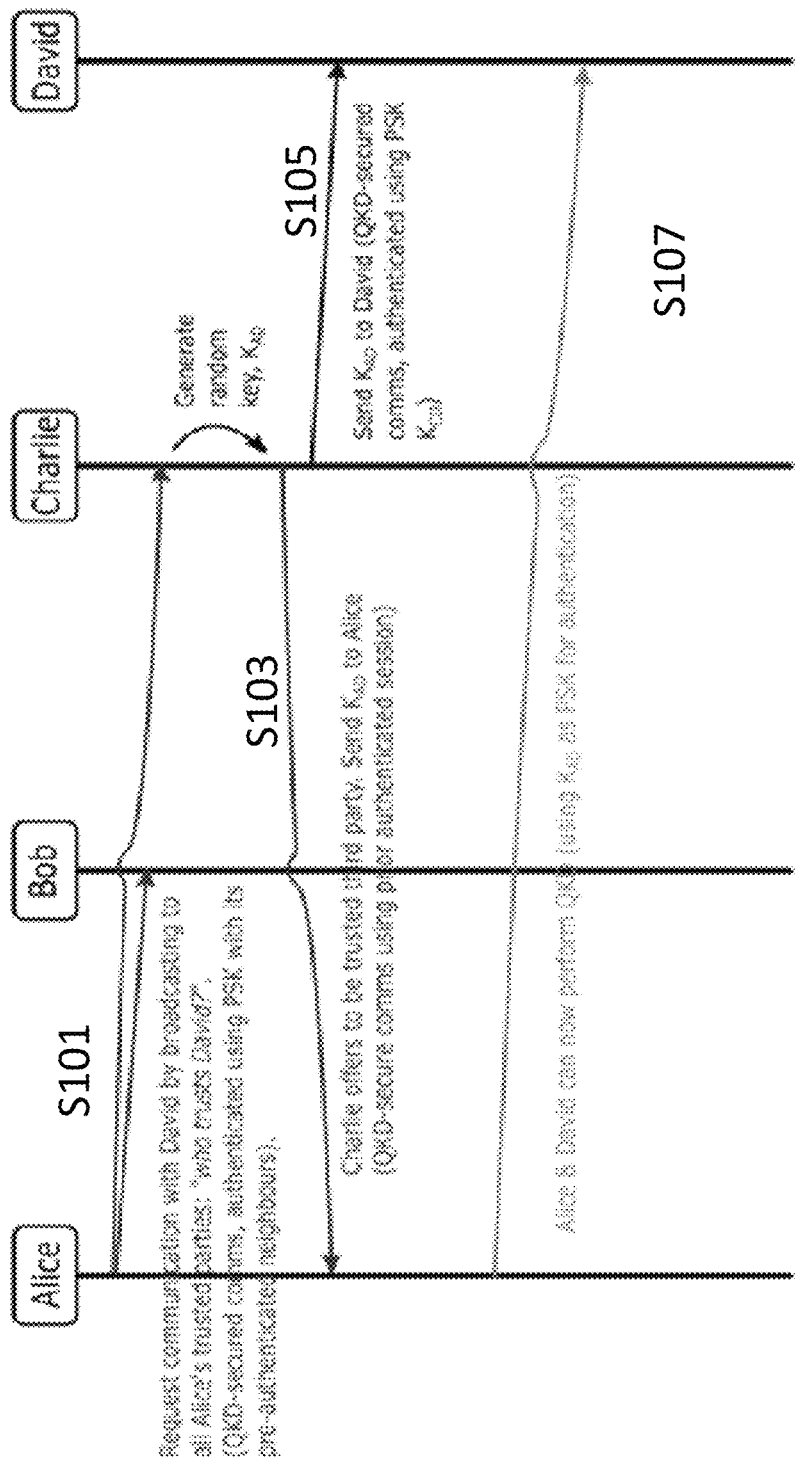

FIGS. 2A and 2B show a method, in accordance with an embodiment, which allows for Alice 1 and Bob 3 to obtain a secure PSK. To avoid unnecessary repetition, like reference numerals will be used to denote like features.

The situation will be considered where Alice 1 already trusts Bob 3 and Charlie 5—i.e. Alice shares a PSK with both Bob 3 and Charlie 5. This could have been installed during their manufacture, or alternatively, the PSKs could have been manually installed by a trusted courier travelling between sites. Now, Alice 1 wishes to communicate with another network user, David 7, but Alice 1 and David 7 do not share a PSK and thus, cannot authenticate in order to perform QKD securely. However, Charlie already trusts David (e.g. due to previous authentication or manually installed PSK).

In the method, in step S101, Alice 1 broadcasts a message to all local users whom she trusts (i.e. with whom she shares a PSK and can authenticate), asking "who trusts David 7?". Bob 3 receives this message and checks his database of PSKs—he doesn't have a PSK with David 7 and thus, takes no further action. Charlie 5 receives this message and checks his database of PSKs—he does have a PSK with David 7 and thus, he replies to Alice 1 in step S103 confirming that he will act as a trusted third party for this transaction.

Charlie then obtains a random number (e.g. using an internal QRNG) which is to be used as the PSK between Alice and David, $K_{AD}$. The random number may be generated in response to receiving the request from Alice 1, for example, using a QRNG in other embodiments, Charlie may have pre-stored random numbers or be able to obtain random numbers securely from an external source.

Charlie 5 already has PSK shared with Alice 1 and this is then used to allow Alice 1 and Charlie to authenticate with one another and commence a QKD session.

Charlie 5, then uses the QKD link between him and Alice 1 to generate a QKD key using a known QKD protocol, for example, the basic QKD protocol described above. Communication over a classical channel is then performed by Alice 1 and the Charlie 5 as part of the sifting process where the classical communication between Alice 1 and Charlie is authenticated using the PSK between Alice and Charlie $K_{AC}$. Once the QKD key has been established between Alice 1 and the Charlie 5, this is then used to encrypt $K_{AD}$ to send to Alice in Step S103.

In step S105, the second switch 11 connects Charlie 5 and David 7. Charlie 5 and David 7 authenticate using their pre-shared PSK, $K_{CD}$ which was installed by the manufacturer previously or otherwise securely shared. Charlie 5 and David 7, then perform QKD to establish a QKD key between Charlie 5 and David 7. The sifting process is performed using an authenticated classical channel between Charlie 5 and David 7 using $K_{CD}$. Once QKD has been performed and a QKD key has been established between Charlie 5 and David 7, the PSK key $K_{AD}$ is then encrypted using the quantum key and sent to David 5.

Thus, Alice 1 and David 7 share a symmetric random key $K_{AD}$. Finally, in step S107, the first switch 9 and second switch 11 connects Alice and David 7 via an optical link. Alice 1 and David 7 now use $K_{AD}$ to authenticate and to perform QKD to securely communicate.

Alice 1 and David 7 now share a PSK, $K_{AD}$ and they can authenticate and commence QKD, enabling them to generate QKD keys to be used for data encryption and thus, quantum-secure communication.

Now Alice 1 and David 7 trust each other, they can act as a trusted third party for future transactions should other users wish to authenticate with one of them. Thus, this embodiment permits trust to grow exponentially, starting from a small number of trusted relationships. This creates a "quantum web of trust" for authenticating users, which has parallels with the 'web of trust' concept used in classical cryptography for establishing authenticity between public keys and their owners (cf. PGP). Practically, this approach is a major advantage for quantum networks since it lets large fully meshed networks grow with authentication between any users from a small number of manually installed pre-shared keys.

In the above embodiment, all communication is between users on optical links within the optically switched network and can be authenticated/encrypted using PSK and QKD keys. The classical communication messages (e.g. the initial discussion to identify who will be the trusted third party) could be multiplexed with quantum signals so the network comprises single simplex or duplex fibre connections between the optical switches. Alternatively, multiple fibres could connect the users, with separate fibres for the quantum signals and classical signals.

In yet another embodiment, the classical messages are transmitted over the public internet and kept secure/authenticated through the use of QKD keys that are generated on the quantum links between users in the optically switched network. This reduces the amount of transmission required on the optically switched network, if high-bandwidth classical network links are available.

In an embodiment, the PSKs ($K_{AC}$, $K_{AD}$ and $K_{CD}$) are used just once. For example for ITS security using Wegman-Carter style message authentication codes, PSKs should only be used once. Therefore, in an embodiment, once two users have authenticated and started performing QKD, they discard the previous PSK between them. They can then reserve some of the freshly generated quantum keys in a 'PSK key store' ready for future authentication sessions. Thus, once authenticated, users can securely communicate using QKD without needing to obtain a PSK from a third node. In other words, when QKD is used to establish a key, part of the key is used for encrypting the messages to be sent and part of the key is reserved to be an authentication key for the next time QKD will be performed.

Figure 3:
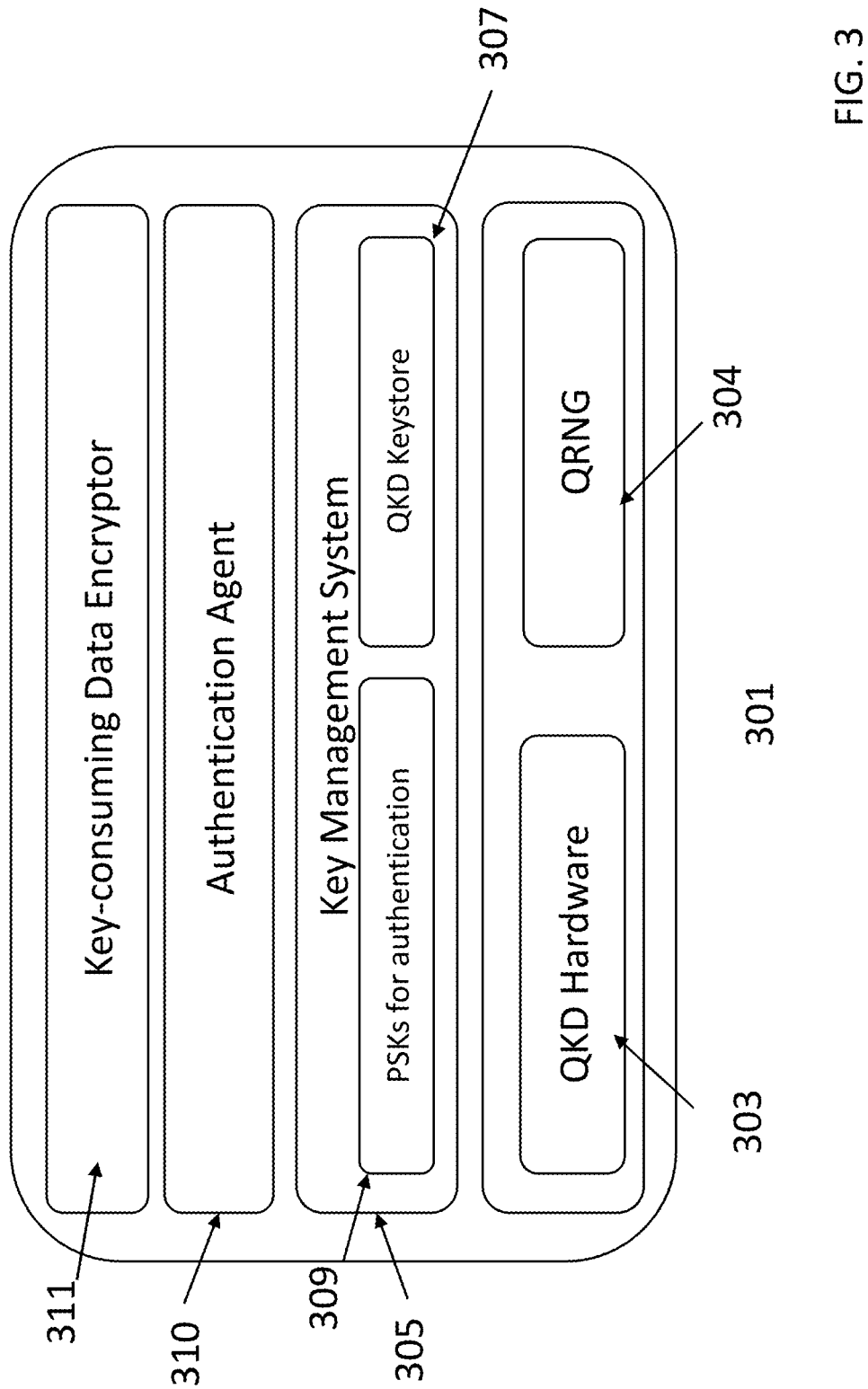
FIG. 3 is a schematic of a user node.

FIG. 3 shows in detail the components of one of the nodes, for example Alice 1, Bob 3, Charlie 5 and David 7.

Turning first to the node of FIG. 3, node 301 comprises QKD hardware for generating quantum keys 303. The QKD hardware can comprise a quantum transmitter and a quantum receiver.

Figure 4A:
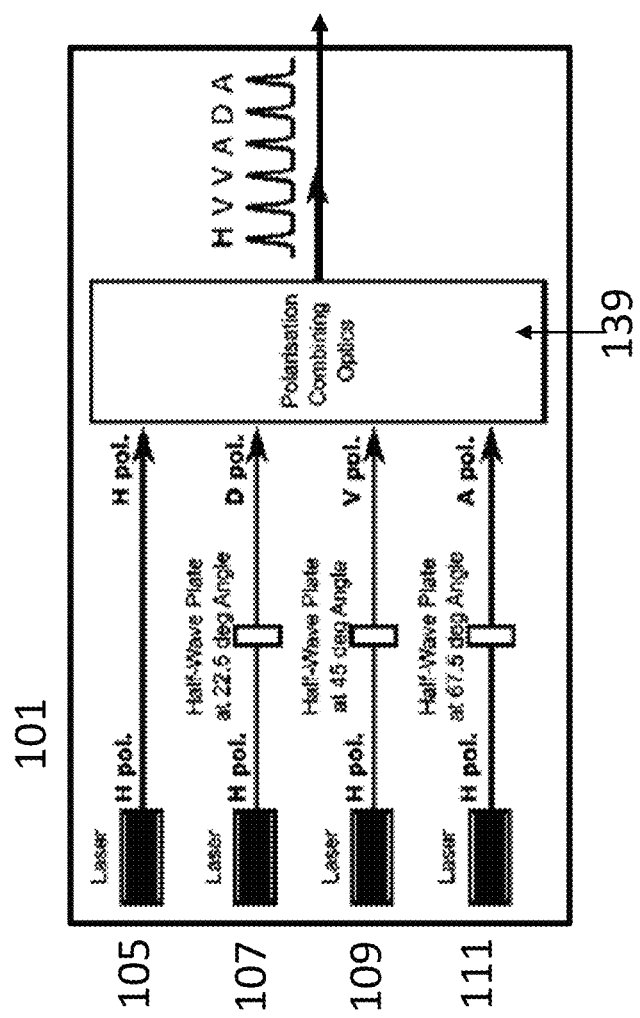
FIG. 4A is a schematic of a QKD transmitter.

An example of a possible transmitter is shown as 101 in FIG. 4A. The transmitter can be any type of quantum transmitter which is capable of emitting polarisation encoded photons. In this particular example, the transmitter 101 comprises four lasers, 105, 107, 109 and 111 each of which emit horizontally polarized light. The output from laser 105 is provided towards polarisation combining optics 139. The output from laser 107 is provided towards polarisation combining optics 139 via a half wave plate which is configured to convert the horizontally polarized light to diagonally polarized light. The output from laser 109 is provided towards polarisation combining optics 139 via a half wave plate which is configured to convert the horizontally polarized light to vertically polarized light. The output from laser 111 is provided towards polarisation combining optics 139 via a half wave plate which is configured to convert the horizontally polarized light to anti-diagonally polarized light.

Polarisation combining optics allows the different polarisations to be combined into a stream of pulses with randomly varying polarisations. This may be achieved in many different ways. For example, the lasers may be pulsed lasers and a controller (not shown) is provided to randomly select a laser from lasers 105, 107, 109 and 111 to randomly output a pulse such that one pulse at a time reaches the polarisation combining optics. In other embodiments, the polarisation combining optics or a further component may be configured to randomly select the output from one laser or randomly selectively block the output from three lasers to allow for the pulsed output stream. The pulses may be produced by pulses lasers or cw lasers may be used with a further component to chop the output into pulses.

An attenuator (not shown) is then used to attenuate the output of the pulses so that they contain on average less than one photon. Alternatively, single photon emitters can be used instead of lasers 105, 107, 109 and 111.

Figure 4B:
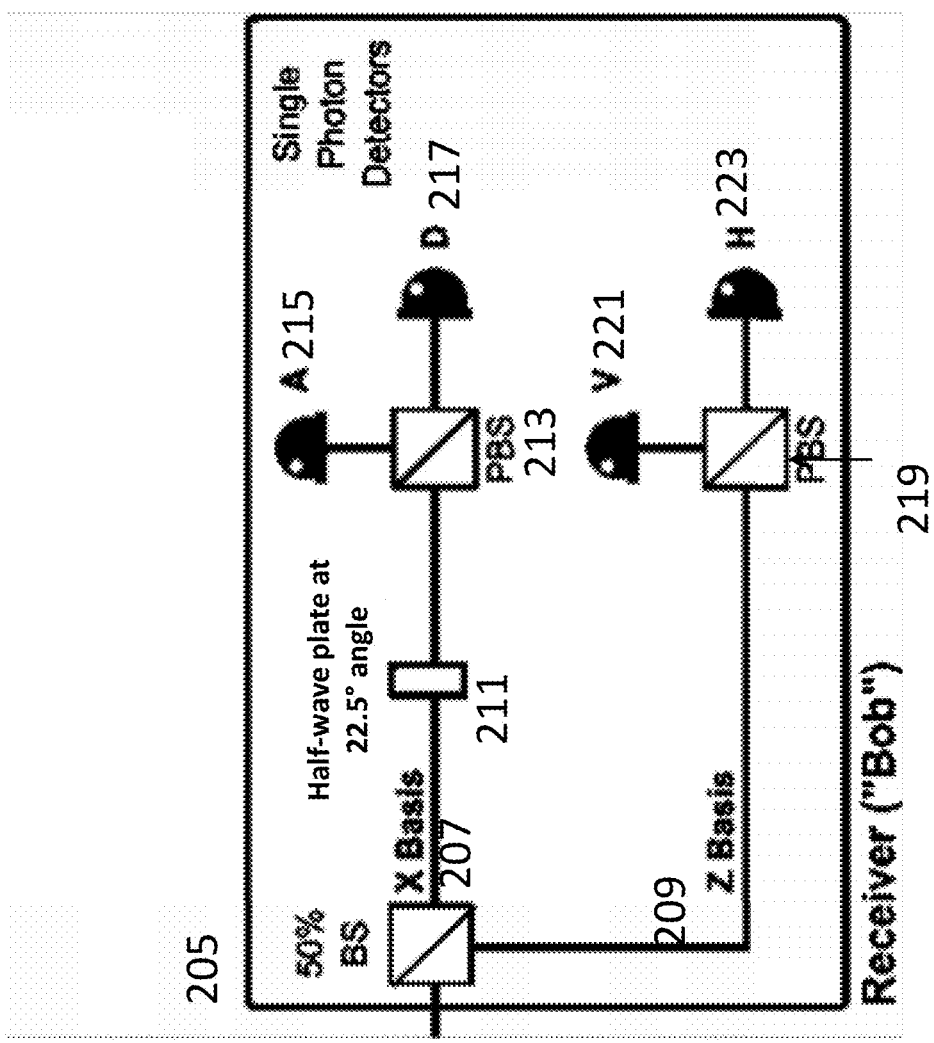
FIG. 4B is a schematic of a QKD receiver.

A simplified form of the receiver is shown in FIG. 4B. The receiver comprises a 50-50 beam splitter 205 which will direct the incoming pulse either along first measurement channel 207 or a second measurement channel 209. Since the pulses contain on average less than one photon, the 50-50 beam splitter 205 will direct the pulse randomly along one of the first measurement channel or the second measurement channel. This has the result of selecting a measurement basis to be the X (D/A) basis or the Z (H/V) basis. The non-polarising beam splitter 205 functions to allow random selection of one of the two bases.

The first measurement channel is for the X basis which corresponds to the D/A bases. Here, a half wave plate 211 is provided to rotate the polarisation by 45 degrees between the two detection branches, i.e. giving the 2 measurement bases X and Z. The output of the half wave plate 211 is then directed towards polarising beam splitter 213. Polarising beam splitter 213 directs pulses with anti-diagonal polarisation towards anti-diagonal detector 215 and pulses with a diagonal polarisation towards diagonal detector 217. Detectors 215 and 217 are single photon detectors, for example avalanche photodiodes.

Pulses directed along the second measurement channel are measured in the Z basis to determine if they are horizontal or vertical. Here, the pulses directed into the second measurement channel are directed toward polarising beam splitter 219 which directs vertically polarised pulses towards detector 221 and horizontally polarised pulses towards detector 223. Again, detectors 221 and 223 are single photon detectors.

If a photon is received which is polarised in the D/A bases and this is randomly sent to be measured in the Z bases along the second management channel 209, one of detectors 221, 223 are likely to register a count. However, this result cannot be trusted as a photon received at polarising beam splitter 219 has a 50-50 chance of being directed towards either the vertical or the horizontal detector.

In an embodiment, the QKD hardware 303 in node 301 will comprise both a transmitter and a receiver dependent on whether the node is to work as a transmitter or a receiver during the QKD process. However, it is possible for the node to contain just a transmitter if it will just perform QKD with nodes which have a receiver and also a node may contain just a receiver if it will just perform QKD with nodes which have a transmitter.

In addition to the QKD hardware, in this embodiment, the user node 301 comprises a quantum random number generator 304 which may be used to control the measurement/encoding basis and also generate a PSK for sharing with two trusted nodes as explained in relation to FIGS. 2 and 3 in relation to Charlie 5.

The node 301 also has a key management system 305. The key management system manages key exchange and storage. In the example of FIG. 3A the key management system 305 comprises a QKD store 307 which stores the key established via QKD which is to be used for encrypting communications and PSK storage which is allocated to save PSKs that the user has shared with other network users which can be used for authentication. Some of these PSKs may be pre-stored in the node prior to use, others may be received from a trusted node (encrypted vis a quantum key), other PSKs may be reserved parts of keys generated using QKD.

The node 301 also comprises a key consuming encryptor 311. The data encryptor uses QKD keys to encrypt/decrypt data communications (e.g. using the one-time-pad or an alternative cipher such as AES).

The node may also comprise an authentication agent 310 which is used during authentication. This may be a standalone component or part of any of the other components of the user node 301, for example the key consuming data encryptor.

Figure 5A:
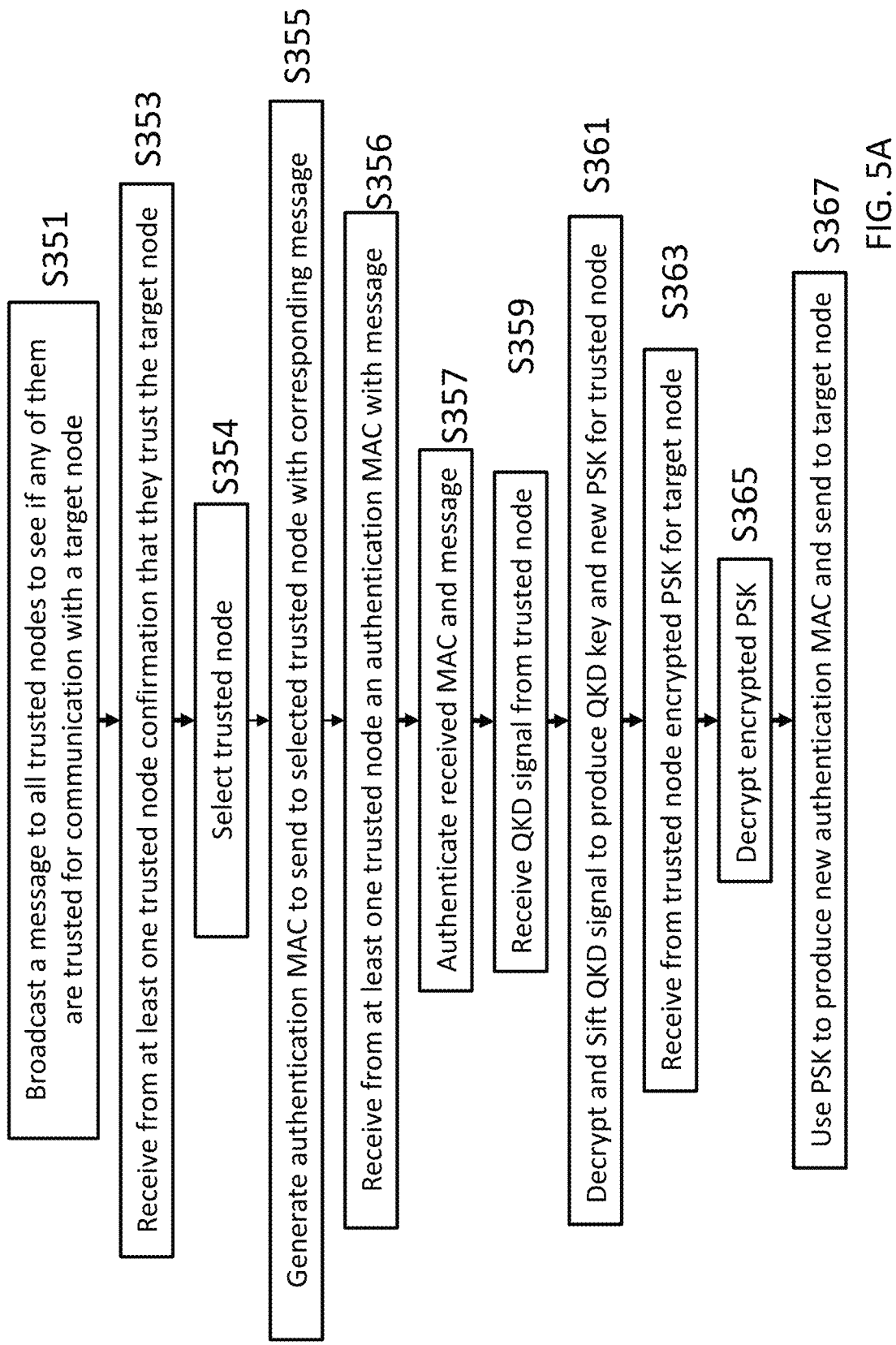
FIG. 5A is a flow chart showing the steps performed by a user node when requesting a PSK.
Figure 5B:
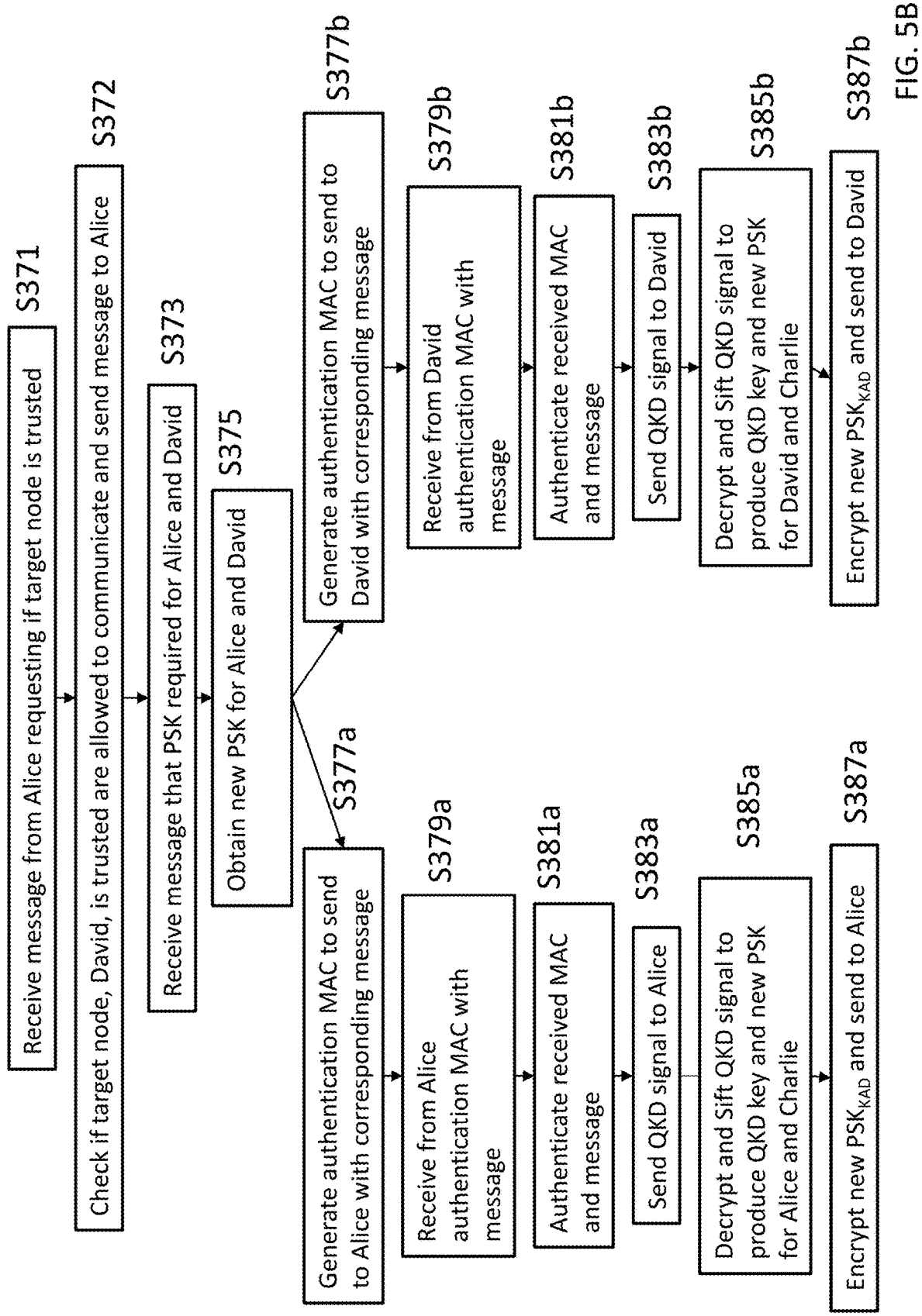
FIG. 5B is a flow chart showing the steps performed by a further user node when responding to the requests of the user node of FIG. 5A.

FIGS. 5A and 5B are flow chart which summarise the operations performed by a user node when desiring to communicate with a node for which they do not have a PSK and the steps performed by a trusted $3^{rd}$ party node respectively in accordance with an embodiment.

A user node, for example Alice, performs the steps of the method of FIG. 5A. In step S351, Alice broadcasts a message to all nodes trusted by Alice (i.e. for which she shares a PSK) to see if any of them trust the target node to request authentication with a new node (David).

In step S353, Alice receives a message from at least one trusted node confirming that they trust David. In step S354, if more than one trusted node indicates that they trust David, the target node, them Alice will select in step S354 which trusted node to use. For example, selection could be based on the first node to respond or a selection criteria could be applied such as the above described QoS criteria discussed earlier.

Alice then needs to authenticate with the selected node. Using the above described example, authentication is performed using a MAC code which is produced by inputting a message and a PSK (which has been pre-shared between the selected trusted node and Alice). In step S355, Alice generates an authentication MAC and sends to the selected trusted node (which from hereon will be referred to as Charlie) with the corresponding message as described above.

Independently, in step S356 Alice receives from Charlie an authentication MAC with a message. In this flowchart, step S356 is shown following step S355. However, these steps could take place in the reverse order or take place simultaneously. Possibly, one or more of the steps could take place prior to the sending of the message in step S351.

To determine whether Alice trusts Charlie, Alice authenticates the message received in step S356 by inputting the message and her own PSK key into a pre-agreed algorithm to see if she matches the MAC code in step S357. This can be performed in the authentication agent 310.

Once the authentication has taken place and Alice knows that she can trust Charlie (ensuring there is no man-in-the-middle attack), Alice and Charlie perform QKD as described above. In this example, it is assumed that Alice receives the QKD signal (i.e. the encoded light pulses) and the pulses are produced from Charlie. However, the reverse situation could also occur.

In step S361, Alice then decrypts the QKD signal by changing her measurement basis. In this embodiment, a longer key is extracted from the QKD protocol than is strictly required. Part of the longer key will be used as the QKD key and another part of the shared key will be saved as a new PSK for Alice and Charlie.

Once Alice and Charlie have shared the QKD key, Alice then receives in step S363, a key which is encrypted by the QKD key. This key which is encrypted by the QKD key is the PSK $K_{AD}$ that she will now use to authenticate with the target node, David. Alice then decrypts the new key ($K_{AD}$) in step S365.

Alice can then use $K_{AD}$ to start authentication the target node (David). The first step of this is shown in step S367 where Alice uses the PSK to produce a new authentication MAC and sends it to David.

FIG. 5B set out the steps performed by the node, Charlie. In step S371, Charlie receives a message from Alice to authenticate with a target node (for example David). In step S372, Charlie checks to see if he has a shared PSK with David. If he has, he messages Alice to say that he trusts David.

In step S373, Charlie receives a message from Alice that she requires a PSK to be shared with David. In step S375, Charlie obtains a new PSK for Alice and David to use. As explained with reference to FIG. 3, Charlie can use his random number generator (QRNG) to generate the PSK once it receives a request. However, Charlie may also have pre-stored random numbers ready to use as PSK's. The new PSK will be called $K_{AD}$.

In step S377a, Charlie generates an authentication MAC to send to Alice with a corresponding message and Charlie also receives from Alice an authentication MAC with a message in step S379a. It should be noted that steps S377a and S379a can be performed simultaneously or in the reverse order. Also, it is possible for the authentication steps of S377a and S379a to be performed prior to the receipt of message in step S371 or before any of the previously described steps.

Once Charlie has received the authentication MAC with message, Charlie authenticates this in step S381a. To do this, Charlie inputs the received message and the PSK that they are sharing with Alice and compares the generated MAC to the one received from Alice.

Once this has been completed, Charlie starts to perform QKD with Alice in step S383a. In this embodiment, Charlie sends random encoded light pulses to Alice. Charlie encodes the light pulses by preparing light pulses with a randomly changing basis as described above. Charlie performs sifting to produce the QKD key in step S385a. Sifting may be prepared by receiving information over the authenticated channel from Alice indicating the measurement basis that she used. Charlie then sends information to Alice over the classical channel to advise her of which results were measured with the correct basis. Charlie then only retains the results of the pulses that were measured with a basis that matched the preparation basis to produce the QKD key.

In this example, a longer key is prepared by the sifting process than is needed for QKD. The excess key is then saved as one or more PSKs to allow Charlie and Alice to have a new PSK $K_{AC'}$ to use when they next need to authenticate.

Charlie then encrypts $K_{AD}$ with the QKD key material generated by performing QKD between Alice and Charlie, and sends this to Alice.

The above has been described for communication with Alice. However, Charlie also performs the same steps for communication with David. In the flow chart of FIG. 5B, steps S377b, S379b, S381b, S383b, 385b and S387b correspond to steps S377a, S379a, S381a, S383a, 385a and S387a respectively, except that the steps with the "a" suffix relate to steps performed by Charlie in relation to Alice and steps with the "b" suffix relate to steps performed by Charlie in relation to David. Steps S377b, S379b, S381b, S383b, 385b and S387b may be performed at the same time as steps S377a, S379a, S381a, S383a, 385a and S387a, interleaved with these steps or performed before or after them.

Alice receives the PSK $K_{AD}$ in step S387a and David receives the PSK $K_{AD}$ in step S387b which allows Alice and David to authenticate their classical channel.

Figure 6:
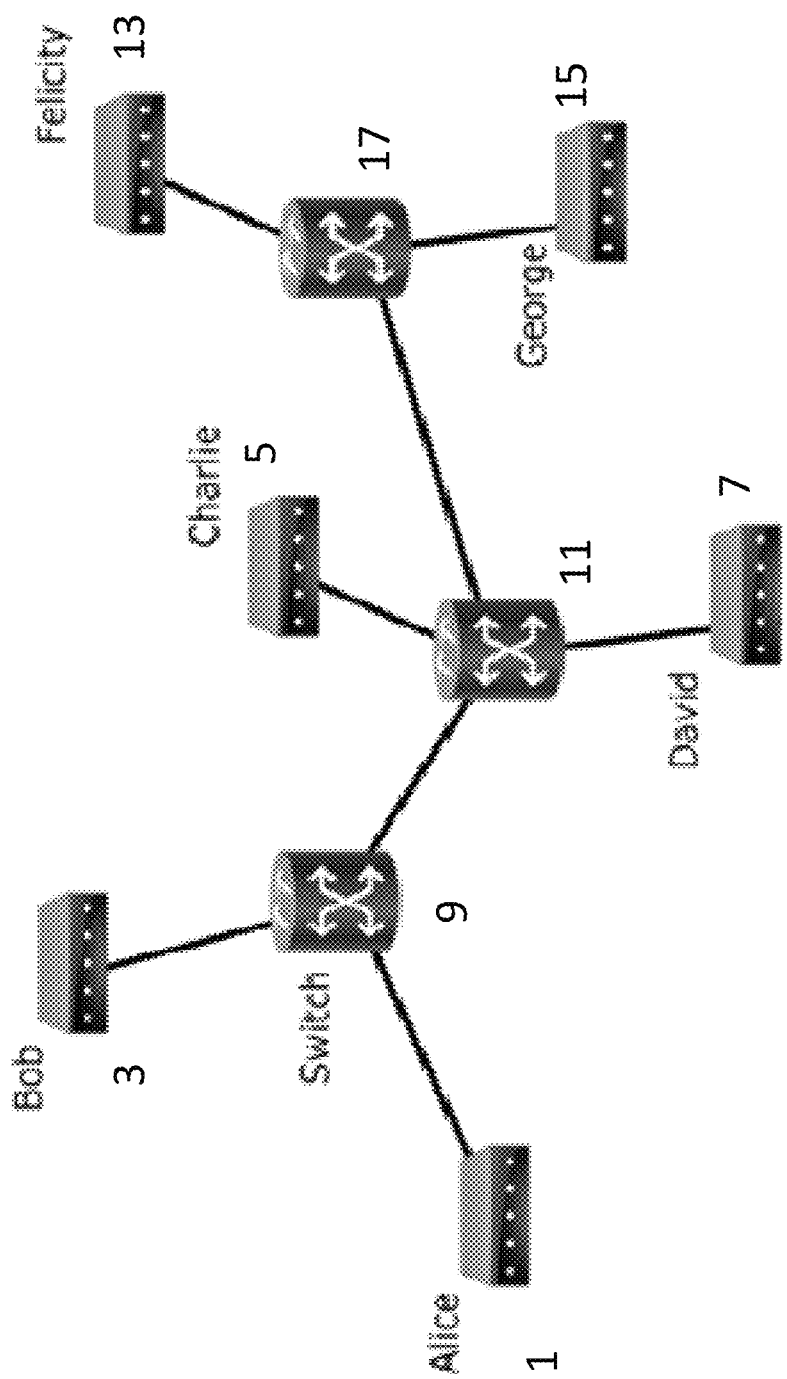
FIG. 6 is a schematic of a network in accordance with an embodiment.

The above can be extended to allow authentication to be established by a multi-hop peer-to-peer approach. FIG. 6 shows a larger network, comprising 6 nodes: Alice 1; Bob 3; Charlie 5; David 7; Felicity 13 and George 15. As in FIG. 2, Alice and Bob can communicate via first switch 9 and Charlie 5 and David 7 are connected via second switch, 11.

Felicity 13 and George 15 are connected via third switch 17. The first switch 9 is connected to the second switch 11, and the second switch 11 is connected to the third switch 17. This allows any of the user nodes to communicate with one another.

Figure 7:
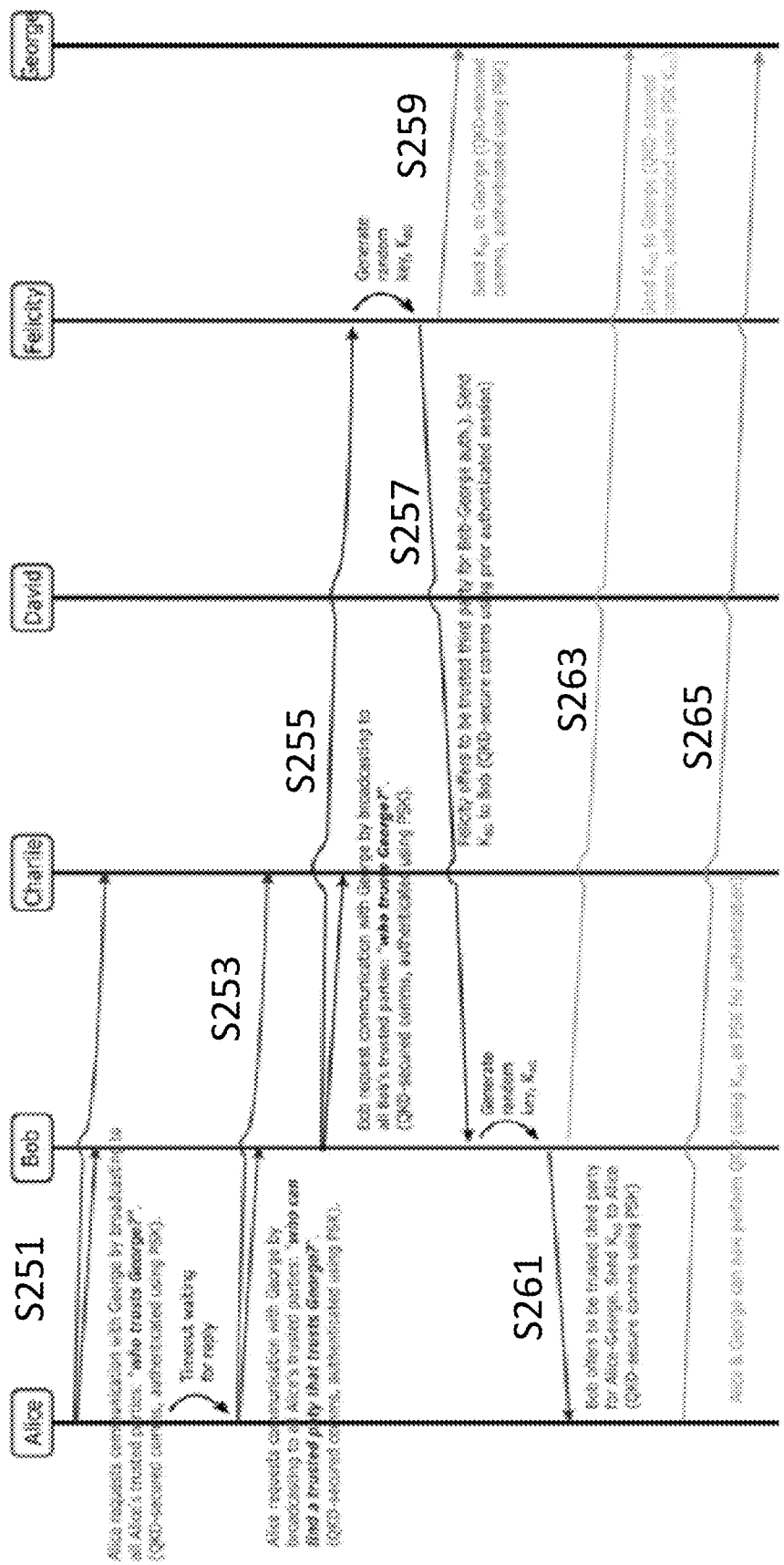
FIG. 7 is a schematic showing the messages passed between two trusted nodes and two user nodes.

In this embodiment, Alice 1 now wishes to communicate with George 15 but they don't share a PSK. In fact, the only user who trusts George is Felicity 13. Felicity 13 trusts (i.e. has PSK with) Bob 3 but there is no trust between Alice 1 and Felicity 13. The message flow is shown in FIG. 7.

As in the embodiment of FIGS. 2A and 2B, Alice 1 starts by broadcasting to user nodes she trusts (in this case: to Bob 3 and Charlie 5): "who trusts George?" in step S251. Neither Bob or Charlie have PSK with George so they don't reply.

In this embodiment, a solution to establish authentication on this network is found by Alice 1 broadcasting (to trusted users Bob 3 and Charlie 5) a follow-up request (since no-one replied to the first message) asking: "who can find a trusted third party that trusts George 15?" in step S253.

Bob 3 and Charlie 5 receive this message and then broadcast to the users they themselves trust: "who trusts George?" in step S255. For simplicity, in this example, only Bob's broadcast will be considered. It will also be assumed that Bob trusts Charlie 5 and Felicity 13. Since Felicity 13 is a trusted user of Bob 3, she receives this message and since she trusts George 15, she replies "I trust George and can be a trusted third party" in step S257.

Felicity 13 generates a random key $K_{BG}$ and uses the PSK she shares with Bob 3 and George 15 to send them both a copy of this key, over a QKD-secured authenticated link in S257 and S259. A QKD secured authentication link is described above and is it used to produce a quantum key. The PSK $K_{BG}$ is then encrypted using the quantum key.

PSK $K_{BG}$ establishes trust (i.e. the possibility to authenticate) between Bob 3 and George 15. Now that Bob 3 trusts George 15, Bob 3 can act as the trusted third party to authenticate Alice 1-George 15 communication. Bob 3 thus generates a random key $K_{AG}$ and uses the PSK he shares with Alice and George to send them both a copy of this key, over a QKD-secured authenticated link in steps S261 and S263. As a result of these peer-to-peer interactions, Alice 1 and George 15 now share a PSK and can securely authenticate and perform QKD, enabling secure communications in step S265. This embodiment thus furthers the scalability of network authentication.

The above described peer-to-peer QKD authentication system and method is scalable for many-users. FIG. 8 shows a large networks which comprises long-distance backbones connecting groups of users within metro networks.

The arrangement shown in FIG. 8 can be viewed as three local networks 813, 815 and 817 The three local networks 813, 815 and 817 are connected via a central network switch 821.

In this embodiment, the first network 813 has three switches 809a, 809b and 809c which interconnect nodes 811a-811f.

Central network Switch 821 is connected to the first local network 813, the second local network 815 and the third local network 817 via long distance QKD links. Long distance QKD links may be a continuous optical fibre or an optical fibre with quantum repeaters. In further embodiments, one or more of the long distance QKD links can be via a satellite connection (not shown) or other type of long distance connection.

Central network switch 821 can be connected to each of the local networks via a local switch, e.g. switch 809b of each local network 813, 815 and 817.

When a user, for example, user 811a wishes to authenticate with another user, the initial broadcast message from Alice (where a user tries to locate a trusted third party to authenticate a new untrusted connection) does not need to be sent to all users that Alice trusts at once, since this could potentially be a large number of users.

In an embodiment, user 811a starts broadcasting to users who are geographically nearer, for example within their local network and/or the nearest local networks and then broadcast to other more remote trusted users if they do not get a reply from a suitable trusted third party within a given timeout period from contacting the most local nodes. This enables more efficient utilisation of the reconfigurable links within an optically switched network.

The above described peer-to-peer authentication process is open to advanced management and quality of service (QoS) concepts. For example, metadata could be stored alongside the PSK material, indicating whether the key was manually installed, or whether it came from a trusted third party (and if so, who the third party was). This could enable key revocation should the trusted third party later be found to be compromised. Similarly, the process of broadcasting to a user's pre-authenticated neighbours to find a trusted third party can be managed to prioritise certain criteria (e.g. start by finding the closest node, or nodes meeting other criteria, such as relating to the particular optical routes though the network—e.g. the lowest latency, least congested route etc.).

In relation to FIG. 7 above, a method is described where a multi-hop approach is employed. In some embodiments, the user 811a may first broadcast to users who are geographically nearer, but then may broadcast either to a larger area and/or look for nodes that can allow the multi-hop approach of FIG. 7. In these situations, whether or not to select a geographically further "single-hop" or a closer "multi-hop" can be determined using a number of different criteria, for example, looking at which route has lowest latency, uses preferred vendor equipment, has larger key stores available, uses a preferred optical route through the network, uses a least congested route through the network, etc It is worth noting that by establishing an authentication PSK through a trusted third party in a peer-to-peer way, the trusted third party also knows the value of the PSK. Consider the case of a quantum network shown in FIG. 9. For this situation, Alice and Bob both share PSK with David and Charlie, but Alice and Bob don't trust each other. They want to communicate, however, and how this can be achieved via trusted third party authentication will be described with reference to FIG. 9.

For the case of Alice and Bob authenticating using $K_{AB}$ issued by Charlie, the users must implicitly assume that Charlie is trustworthy, since he could potentially perform a man-in-the-middle attack to read secure communications between Alice and Bob.

In the system of FIG. 9, this assumption can be relaxed by using two trusted third parties in a peer-to-peer scenario in a network. Alice and Bob now obtain a PSK from each of Charlie and David (following previously outlined method), these PSKs being denoted as PSKs $K1_{AB}$ and $K2_{AB}$, coming from QKD with Charlie and David, respectively. Alice and Bob then form their actual PSK by performing an XOR operation using these two keys:

$$K_{AB} = K1_{AB} \oplus K2_{AB}$$

This means that they share a symmetric shared key, but now this key is not shared by Charlie or David, providing resilience (against a man-in-the-middle attack) should either of these servers be compromised.

The above authentication concept relates to relaxing an assumption that is required when a manufacturer installs a point-to-point QKD link. When the same manufacturer installs both endpoints of the link, using a pre-installed PSK, the users of the system have to implicitly trust the manufacturer won't perform a man-in-the-middle attack. With the above peer-to-peer authentication scheme, and even the multiple-trusted-party-XOR-scheme, QKD links can be formed between hardware from different manufacturers, authenticated by independent third parties—thus removing the requirement for trusting the manufacturer for authentication The above embodiments enable arbitrary remote users to perform authenticated communications, so they can commence a QKD session to generate additional key material. This QKD key material can then be used for secure communications of arbitrary large data sizes. We propose our invention to cover the peer-to-peer authentication system and the resulting optically switched quantum communication network design.

The above embodiments provide a solution for authentication to be performed using network links rather than manually installing keys at each site with trusted couriers. This greatly improves scalability, enabling exponential growth of networks through peer authentication.

In summary, the above embodiments:
Enable users on quantum networks to securely communicate without manual installation of authentication keys
The decentralised approach is robust against failure of any part of the network
Scalable design for networks, and even networks of networks over large geographical areas (compatible with various QKD protocols, e.g. TF-QKD for long-distances or satellite QKD).
Compatible with free-space and fibre optics communications channels.
Various embodiments of the concept are possible, supporting diverse network topologies
Robustness against the unlikely event of a compromised trusted third party via XOR of multiple PSKs.
Compared to classical/PQC approaches to authentication, the above embodiments are robust against advances in cryptanalysis and cryptographic attacks by quantum computers Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method for use in a quantum communication network comprising a first node, a second node and a third node, the method performed by the third node, the method comprising:
receiving, from the first node, a request for authentication key data for authenticating communication with the second node;
in response to the request:
generating the first authentication key data;
sending, to the first node, a first message comprising first authentication key data for authenticating communication between the first node and the second node, wherein the first message is authenticated using second authentication key data stored on the first node and the third node, and wherein the first message is encrypted using a first cryptographic key exchanged with the first node on the quantum communication network; and
sending, to the second node, a second message comprising the first authentication key data, wherein the second message is authenticated using third authentication key data stored on the second node and the third node, and wherein the second message is encrypted using a second cryptographic key exchanged with the second node on the quantum communication network.

2. The method of claim 1, wherein the quantum communication network further comprises one or more trusted nodes, the method further comprising:
determining that authentication key data is not available for authenticating communication with the second node;
requesting, from the one or more trusted nodes, authentication key data for authenticating communication with the second node;
receiving, from a fourth node of the one or more trusted nodes, a third message comprising the third authentication key data, wherein the third message is authenticated using fourth authentication key data stored on the third node and the fourth node, and wherein the third message is encrypted using a third cryptographic key exchanged with the fourth node on the quantum communication network; and
storing the third authentication key data.

3. The method of claim 2, wherein the request comprises one or more quality of service criteria, and wherein the one or more trusted nodes are selected from a plurality of trusted nodes based on the one or more quality of service criteria.

4. The method of claim 2, wherein the first message comprises an indication that the identity of the second node was authenticated using the fourth node.

5. A method, for use in a quantum communication network comprising a first node, a second node and one or more trusted nodes, the method performed by the first node, the method comprising:
requesting, from the one or more trusted nodes, authentication key data for authenticating communication with the second node;
receiving, from a third node of the one or more trusted nodes, a first message comprising first authentication key data for authenticating communication with the second node, wherein the first message is authenticated using second authentication key data stored on the first node and the third node, and wherein the first message is encrypted using a first cryptographic key exchanged between the first node and the third node on the quantum communication network.

6. The method of claim 5, further comprising:
receiving, from a fourth node of the one or more trusted nodes, a second message comprising third authentication key data for authenticating communication with the second node, wherein the second message is authenticated using fourth authentication key data stored on the first node and the fourth node, and wherein the second message is encrypted using a second cryptographic key exchanged between the first node and the fourth node on the quantum communication network; and deriving, based on the first authentication key data and the third authentication key data, fifth authentication key data for authenticating communication with the second node.

7. The method of claim 6, wherein deriving the fifth authentication key data comprises performing one or more bitwise operations on the first authentication key data and the third authentication key data.

8. The method of claim 7, wherein the one or more bitwise operations comprise an XOR operation.

9. The method of claim 5, further comprising:
receiving an indication that the third node has been compromised; and
revoking the first authentication key data and/or authentication key data derived from the first authentication key data.

10. The method of claim 5, wherein the first message comprises an indication that the third node of the one or more trusted nodes authenticated the identity of the second node using a fifth node other than the one or more trusted nodes.

11. The method of claim 10, comprising:
receiving an indication that the fifth node has been compromised; and
revoking the first authentication key data and/or authentication data derived from the first authentication key data.

12. The method of claim 5, wherein requesting, from the one or more trusted nodes, authentication key data for authenticating communication between the first node and the second node comprises:
requesting, from a first subset of the one or more trusted nodes, authentication key data for authenticating communication between the first node and the second node;
inferring that the first subset of the one or more trusted nodes is unable to provide the authentication key data; and
in response to the inference, requesting, from a second subset of the one or more trusted nodes, authentication key data for authenticating communication between the first node and the second node,
wherein the first subset of the one or more trusted nodes are nodes that satisfy a first criteria, and wherein the second subset of the one or more trusted nodes comprises the third node.

13. The method of claim 5, wherein requesting, from the one or more trusted nodes, authentication key data for authenticating communication between the first node and the second node comprises:
querying the one or more trusted nodes to determine whether any of the one or more trusted nodes stores key authentication data for communicating with the second node;
inferring that none of the one or more trusted nodes stores key authentication data for communicating with the second node; and
querying the one or more trusted nodes to determine whether any of the one or more trusted nodes stores key authentication data for another node that stores key authentication data for communicating with the second node.

14. A first node for use in a quantum communication network comprising the first node, a second node and one or more trusted nodes, wherein the first node is configured to:
request, from the one or more trusted nodes, authentication key data for authenticating communication with the second node;
receive, from a third node of the one or more trusted nodes, a first message comprising first authentication key data for authenticating communication with the second node, wherein the first message is authenticated using second authentication key data stored on the first node and the third node, and wherein the first message is encrypted using a first cryptographic key exchanged with the third node on the quantum communication network.

15. The first node of claim 14, wherein the first node is further configured to:
receive, from a fourth node of the one or more trusted nodes, an indication that a fifth node other than the one or more trusted nodes, wishes to initiate communication;
receive, from the fourth node, a second message comprising second authentication key data for authenticating communication with the fifth node, wherein the second message is authenticated using third authentication key data stored on the first node and the fourth node, and wherein the second message is encrypted using a second cryptographic key exchanged with the fourth node on the quantum communication network.

16. The first node of claim 15, wherein the first node is further configured to:
receive, from a sixth node of the one or more trusted nodes, a third message comprising fourth authentication key data for authenticating communication with the fifth node, wherein the third message is authenticated using fifth authentication key data stored on the first node and the fifth node, and wherein the third message is encrypted using a third cryptographic key exchanged with the sixth node on the quantum communication network; and
derive, based on the second authentication key data and the fourth authentication key data stored, sixth authentication key data for authenticating communication with the sixth node.

17. The first node of claim 14, wherein the first node is further configured to:
receive, from a seventh node of the one or more trusted nodes, a request for authentication key data for authenticating communication between the seventh node of the one or more trusted nodes and an eighth node;
send, to the seventh node, a fourth message comprising seventh authentication key data for authenticating communication between the seventh node and the eighth node, wherein the fourth message is authenticated using eighth authentication key data stored on the first node and the seventh node, and wherein the first message is encrypted using a fourth cryptographic key exchanged with the seventh node on the quantum communication network; and
sending, to the eighth node, a fifth message comprising the seventh authentication key data, wherein the fifth message is authenticated using ninth authentication key data stored on the first node and the eighth node, and wherein the fifth message is encrypted using a fifth cryptographic key exchanged with the eighth node on the quantum communication network.

18. The first node of claim 14, wherein the first node is further configured to:
determining that authentication key data is not available for authenticating communication with the eighth node;

requesting, from the one or more trusted nodes, authentication key data for authenticating communication with the eighth node;

receiving, from a ninth node of the one or more trusted nodes, a sixth message comprising the ninth authentication key data, wherein the sixth message is authenticated using tenth authentication key data stored on the first node and the ninth node, and wherein the sixth message is encrypted using a sixth cryptographic key exchanged with the ninth node on the quantum communication network; and storing the ninth authentication key data.

19. The first node of claim 18, wherein the fifth message comprises an indication that the identity of the eighth node was authenticated using the ninth node.

20. A quantum communication network comprising the first node of claim 14, a second node and one or more trusted nodes.

* * * * *